March 1, 1960 R. H. SPIERS 2,926,817
COFFEE POT ATTACHMENT FOR CREAM AND SUGAR
Filed Sept. 26, 1958

INVENTOR.
RUPERT H. SPIERS,
BY
McMorrow, Berman & Davidson
ATTORNEYS.

2,926,817

COFFEE POT ATTACHMENT FOR CREAM AND SUGAR

Rupert H. Spiers, Carrabelle, Fla., assignor of one-fourth to Walter H. Edwards, Carrabelle, Fla.

Application September 26, 1958, Serial No. 763,587

3 Claims. (Cl. 222—130)

This invention relates to beverage receptacles, and more particularly to a coffee pot provided with means for attaching auxiliary receptacles thereto, for example, cream and sugar receptacles.

The main object of the invention is to provide a novel and improved beverage receptacle which is simple in construction, which is attractive in appearance, and which is provided with means for supporting auxiliary receptacles, such as cream and sugar containers.

A further object of the invention is to provide an improved beverage container which is inexpensive to manufacture, which is easy to clean, and which is provided with means for detachably supporting auxiliary containers, such as cream and sugar receptacles in readily accessible positions, so that separate receptacles for these materials need not be provided.

Further objects and advantages of the invention will become apparent from the following description and claims, and from the accompanying drawings, wherein:

Figure 1:
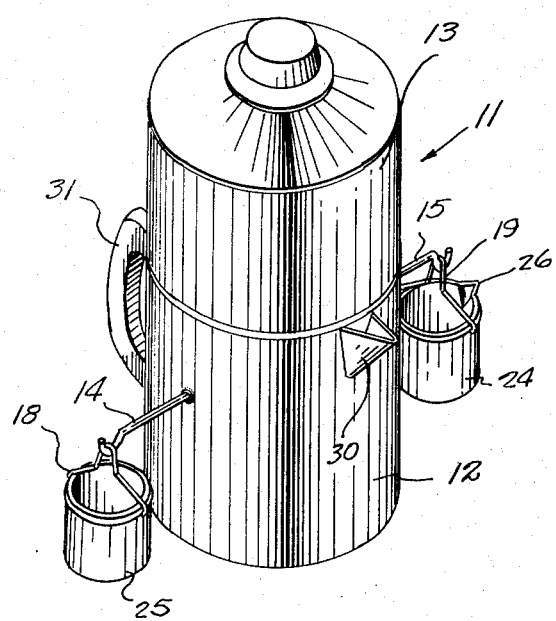
Figure 1 is a perspective view of an improved coffee pot constructed in accordance with the present invention and shown with its auxiliary receptacles detachably connected thereto.

Referring to the drawings, 11 generally designates an improved coffee pot constructed in accordance with the present invention. The coffee pot 11 comprises a bottom receptacle 12 and the removable top receptacle 13 which is employed as a means for supporting the coffee grounds and for receiving hot water to be infused through the coffee grounds, so that the beverage thus produced drips into the bottom container 12.

Figure 3:
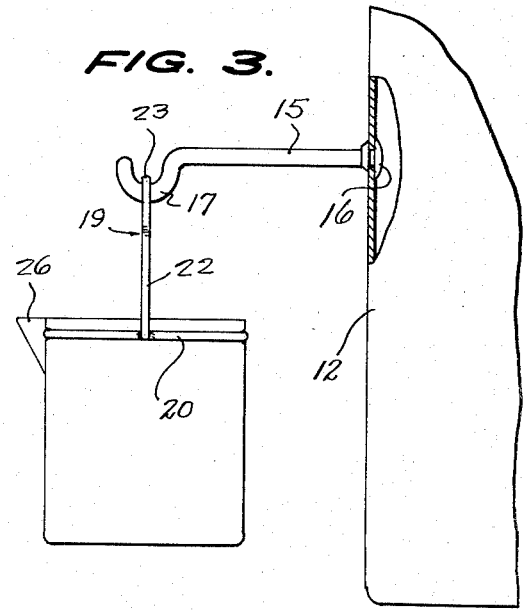
Figure 3 is a vertical cross sectional view taken substantially on the line 3—3 of Figure 2.

In accordance with the present invention, a pair of outwardly projecting hook members 14 and 15 are rigidly secured to diametrically opposite upper portions of the wall of the main container 12, said hook members being fastened to the wall in any suitable leak-proof manner, for example, in the manner illustrated in Figure 3, wherein the end of the hook member 14 extends through an aperture formed in the wall of the container 12 and is then upset or peened over against the inside surface of the wall or container 12, as shown at 16 to provide a rigid and leak-proof joint.

Each of the hook members 14 and 15 is formed at its outer end with an upwardly facing, arcuate depending bight portion 17. Respective resilient supporting clamp members 18 and 19 are removably engaged in the bight portions 17 of the hook members 14 and 15, each of the resilient clamping members 18 and 19 comprising a generally circular clamping ring portion 20 which is open at one portion thereof, as shown at 21. Secured to diametrically opposite points on the ring 20, located symmetrically on opposite sides of the open portion 21 are the ends of a supporting loop member 22 having the downwardly facing relatively narrow loop portion 23. The ring 20 as well as the arms of the loop member 22 are yieldable and resilient so that they may be easily flexed in a manner to be presently described.

Figure 4:
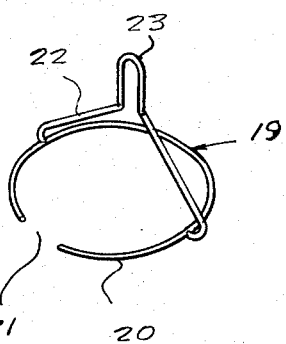
Figure 4 is an enlarged perspective view of one of the resilient clamping support members employed with the auxiliary containers shown in Figure 1.
Figure 2:
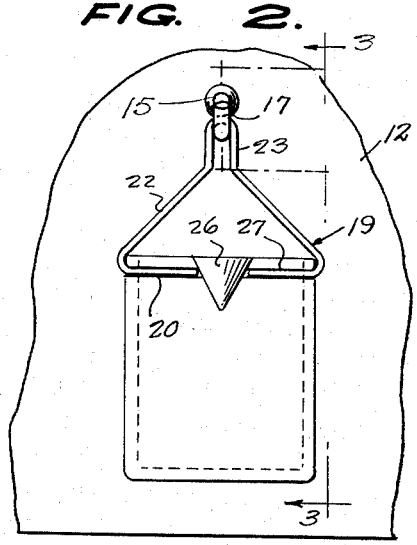
Figure 2 is an enlarged side elevational view showing the manner in which the cream container is removably supported on the coffee pot of Figure 1.

Designated at 24 and 25 are respective auxiliary receptacles adapted to be used with the main coffee pot receptacle 12 in dispensing the beverage therefrom. The receptacle 24 is intended for use as a cream container and is formed at its top rim with a pouring spout 26 to facilitate the discharge of cream therefrom. The container 24 is formed adjacent its top rim with a peripheral groove 27 adapted to receive the generally circular clamping ring 20 of the support member 19. Thus, the clamping ring 22 engages in the groove 27 with the spout 26 received in the open portion 21 of the ring, whereby the cream container 24 may be supported on the hook member 15 in the manner illustrated in Figure 1 with the spout 26 directed outwardly, as shown. Similarly, the support 18, which is of the same construction as shown in Figure 4 is clampingly engageable in the top peripheral groove provided in the sugar receptacle 25. The sugar receptacle 25 may be thus supported on the hook members 14 in the manner shown in Figure 1.

As will be readily apparent, the receptacles 24 and 25 are easily detached from their respective supporting hooks 15 and 14 so that the contents thereof may be dispensed as required, in conjunction with the use of the coffee pot 12.

In using the device, the main coffee receptacle 12 is brought to the table with the auxiliary receptacles 24 and 25 containing cream and sugar respectively, supported on the hook members 15 and 14. This eliminates the necessity of carrying in separate auxiliary cream and sugar containers. The auxiliary receptacles 24 and 25 may then be detached from their supporting hooks 15 and 14 and placed on the table, allowing the main container 12 to be used in pouring coffee therefrom. Alternatively, the auxiliary receptacles 24 and 25 may remain suspended from their supporting hooks 15 and 14 while the coffee is poured from the main container 12, since the supporting hooks 14 and 15 are located on a diameter perpendicular to the diameter defined by the pouring spout 30 and the supporting handle 31 of the main coffee container 12, as is clearly shown in Figure 1. Since the supporting clamp members 18 and 19 are free to pivot on the bight portions of the hook members 14 and 15, coffee may be freely dispensed from the main receptacle 12 without the necessity of removing the auxiliary containers 25 and 24.

While a specific embodiment of an improved beverage receptacle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A beverage receptacle comprising a rigid main beverage container, a pair of diametrically opposed outwardly projecting vertical, upwardly facing supporting hooks rigidly secured to said container, respective inverted loop members pivotally engaged on said supporting hooks and being freely swingable around the diameter defined by said supporting hooks, respective resilient clamping rings secured to said loop members, and respective auxiliary containers detachably secured to said clamping rings.

2. A beverage receptacle comprising a rigid main beverage container, a pair of diametrically opposed outwardly projecting vertical, upwardly facing supporting hooks rigidly secured to said container, respective inverted loop members pivotally engaged on said supporting hooks and being freely swingable around the diameter defined by said supporting hooks, respective auxiliary containers, each auxiliary container being formed with a peripheral groove at its upper portion, and respective resilient clamping rings secured to said loop members and clampingly engaged in the peripheral grooves of the auxiliary containers.

3. A beverage receptacle comprising a rigid beverage container having a pouring spout at its top edge and being provided with a handle diametrically opposed to said pouring spout, a plurality of outwardly projecting vertical, upwardly facing supporting hooks rigidly secured to said container on a diameter perpendicular to the diameter defined by the handle and pouring spout, and respective auxiliary containers pivotally mounted on said supporting hooks and being freely swingable around the diameter defined by said supporting hooks.

References Cited in the file of this patent

UNITED STATES PATENTS

| | | |
|---|---|---|
| 669,961 | Post | Mar. 12, 1901 |
| 2,570,283 | Stevens | Oct. 9, 1951 |